(12) United States Patent
Wilson

(10) Patent No.: US 8,708,085 B1
(45) Date of Patent: Apr. 29, 2014

(54) CONVERTIBLE MOTORCYCLE TRAILER

(71) Applicant: Franklin Delano Wilson, Dade City, FL (US)

(72) Inventor: Franklin Delano Wilson, Dade City, FL (US)

( * ) Notice: Subject to any disclaimer, the term of this patent is extended or adjusted under 35 U.S.C. 154(b) by 0 days.

(21) Appl. No.: 14/050,571

(22) Filed: Oct. 10, 2013

Related U.S. Application Data

(60) Provisional application No. 61/848,801, filed on Jan. 14, 2013.

(51) Int. Cl.
*B62D 61/12* (2006.01)
*B62D 59/00* (2006.01)

(52) U.S. Cl.
USPC .......................................... 180/209; 280/204

(58) Field of Classification Search
USPC .......... 180/209, 208, 215; 280/202, 204, 282, 280/489; 296/168
See application file for complete search history.

(56) References Cited

U.S. PATENT DOCUMENTS

| | | | |
|---|---|---|---|
| 5,853,057 A | 12/1998 | Mullins | |
| 6,454,289 B1 | 9/2002 | Mullins | |
| 6,612,389 B1 | 9/2003 | Bell | |
| 7,121,575 B2 | 10/2006 | Finch | |
| 7,850,184 B1 * | 12/2010 | Beckman, Sr. | 280/204 |
| 7,926,829 B2 | 4/2011 | Bender | |
| 2012/0056400 A1 * | 3/2012 | St Clair et al. | 280/282 |
| 2013/0328278 A1 * | 12/2013 | Davis | 280/6.157 |

* cited by examiner

*Primary Examiner* — Faye M. Fleming
(74) *Attorney, Agent, or Firm* — Thomas Frost

(57) ABSTRACT

The present invention is a trailer assembly with two wheels having a tongue hitch attached to a belly plate. The belly plate is connected to a main frame chassis. The tongue hitch has engagement means which allows the trailer to be attached to a vehicle. The tongue hitch is removable and the plate is secured to the frame of a motorcycle creating a four wheel vehicle. Height adjustment risers and length adjustment risers are mounted to the plate and are engaged with the main frame rail. The trailer assembly can be adjusted to different types of motorcycles. A cross brace/bumper is secured to a distal end of the frame chassis. Decking material mounts on the frame chassis to provide storage capability.

6 Claims, 5 Drawing Sheets

CONVERTIBLE MOTORCYCLE TRAILER

BACKGROUND OF INVENTION

The present invention relates to a trailer that operates in normal manner attaching to a vehicle, but can be adjusted and modified to mount to a motorcycle creating a four wheel vehicle.

It is an object of the invention to, upon removal of tongue support member having hitch receiver engagement means of the trailer, to mount a plate of the trailer to the motorcycle frame modifying the motorcycle to a four wheel vehicle.

It is another object of the invention to provide additional transport storage space by mounting the trailer to the motorcycle, and having removable decking material to fit the motorcycle.

SUMMARY OF THE INVENTION

The general purpose of the present invention, which will be described subsequently in greater detail, is to provide new and improved convertible motorcycle trailer.

The invention is a trailer assembly with two wheels having a tongue hitch attached to a belly plate. The belly plate is connected to a main frame chassis. The tongue hitch has engagement means which allows the trailer to be attached to a vehicle.

The tongue hitch is removable and the plate is secured to the frame of a motorcycle creating a four wheel vehicle. Height adjustment risers and length adjustment risers are mounted to the belly and are engaged with the main frame chassis. The trailer assembly can be adjusted to different types of motorcycles. A cross brace/bumper is secured to a distal end of the frame rail. Decking material mounts on the frame rail to provide storage capability.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
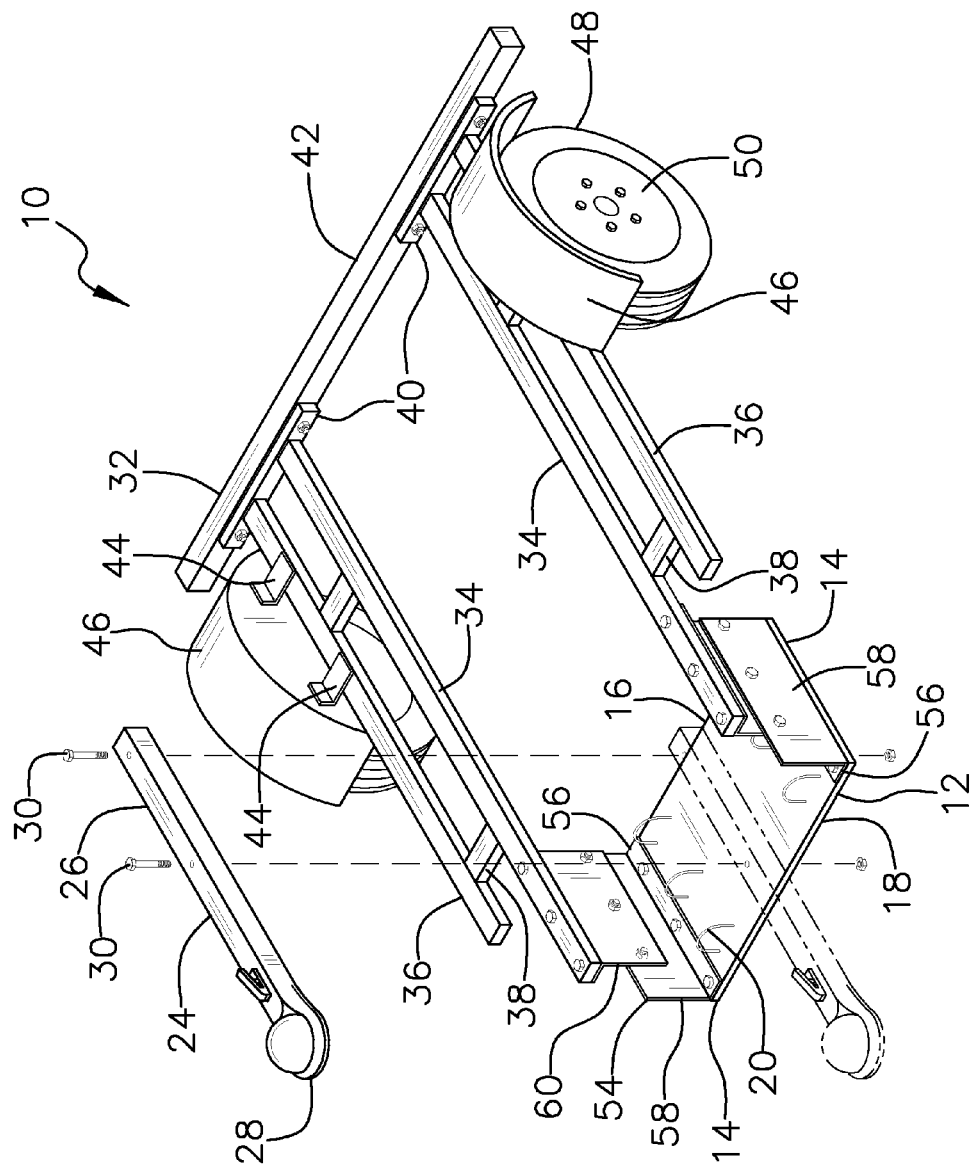
FIG. 1 is an exploded view of the present invention.

Referring to the drawings in general, an embodiment of the present invention 10 will now be described in greater detail.

Referring to FIG. 1, the invention 10 comprises a platform 12 having an upper planer surface and a lower planer surface, and is made of metallic material. The platform 12 has a front peripheral edge 14, a rear peripheral edge 16 and side peripheral edges 18. The platform 12 has a plurality of apertures integrally formed therethrough. A series of u-bolts 20 with complementary nuts 22 are secured on the platform 12.

Figure 6:
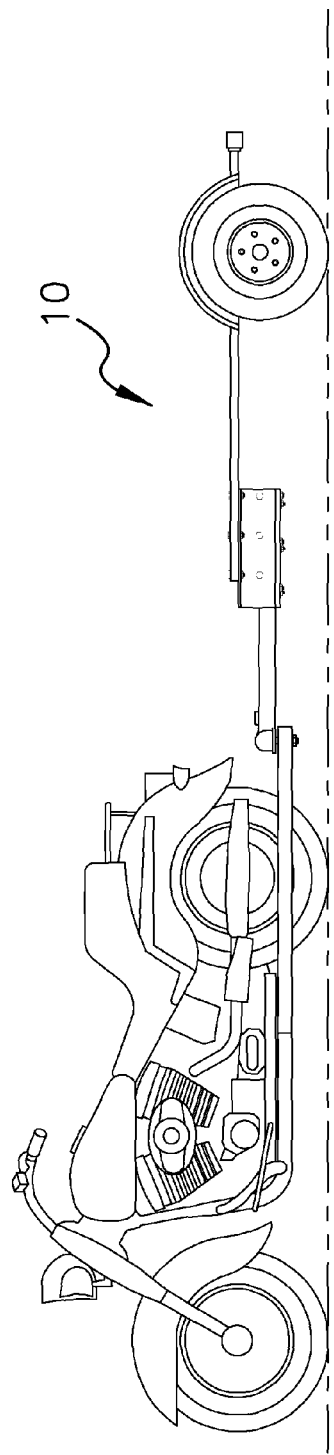
FIG. 6 is a side elevational view of the present invention with a tongue support member attached to a standard trailer hitch on a motorcycle.

A tongue hitch 24, comprised of a generally rectangular shaped tubular rail 26 at a first end and a hitch connector 28 integrally formed at a second end, is mounted by fastening means 30 on the platform 12. The hitch 24 traverses the lower planer surface of the platform 12. The tubular rail 26 of the hitch 24 has a top wall, bottom wall and side walls with aligned apertures formed through the top wall and side wall. Complementary apertures on formed in the platform 12 to align with the apertures formed in the hitch 24. The preferred fastening means 30 is a nut and a bolt for demountably securing the hitch 24 to the platform 12. Securement means such as latches, straps or clamps are possible. The hitch connector 28 is configured to operatively engage with a hitch receiver on a motorcycle or other vehicle (illustrated in FIG. 6).

A generally U-shaped frame 32 has a pair of inner longitudinally placed rails 34 and a pair of outer longitudinally placed rails 36. The rails 34, 36 are formed of rectangular tubing. The rails 34, 36 are positioned so that one inner rail 34 and one outer rail 36 are oriented for the right side of the motorcycle, and the other inner rail 34 and outer rail 36 are oriented for the left side of the motorcycle. Lateral rail supports 38 aligned perpendicular to, and between, the inner rails 34 and outer rails 36, the lateral rail support 38 having a first end affixed to the inner rails 34 and a second end affixed to the outer rails 36. The inner rails 34 are relatively greater in length than the outer rails 36. The rails 34, 36 are connected at the rear by laterally extending cross members 40. The cross members 40 are demountably mounted to a cross brace 42, which acts as a bumper.

Figure 3:
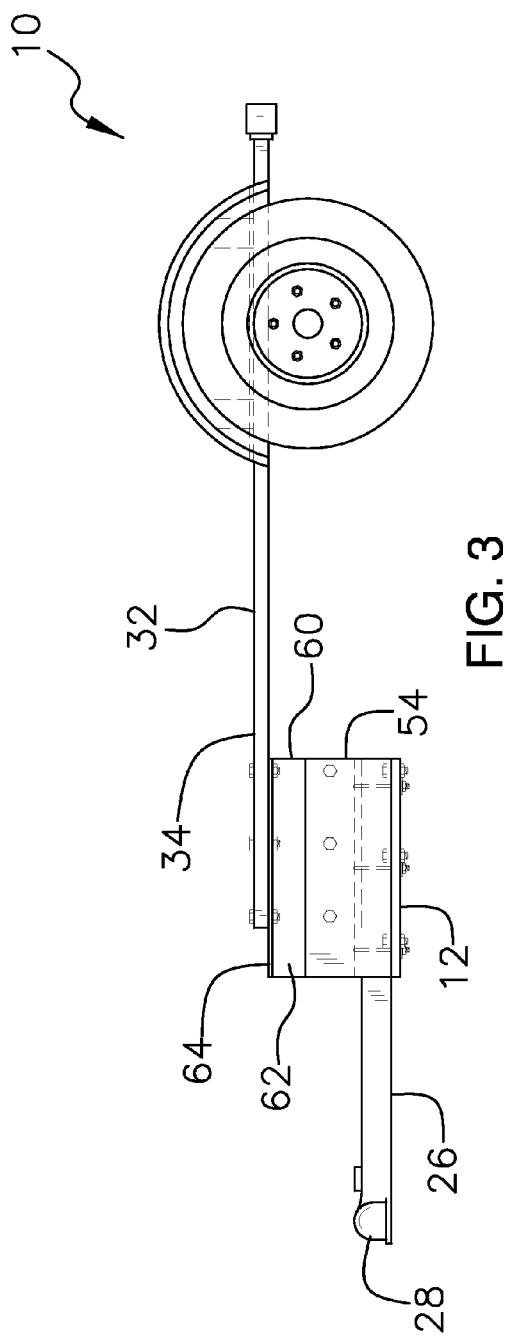
FIG. 3 is a side elevational view of the present invention.
Figure 4:
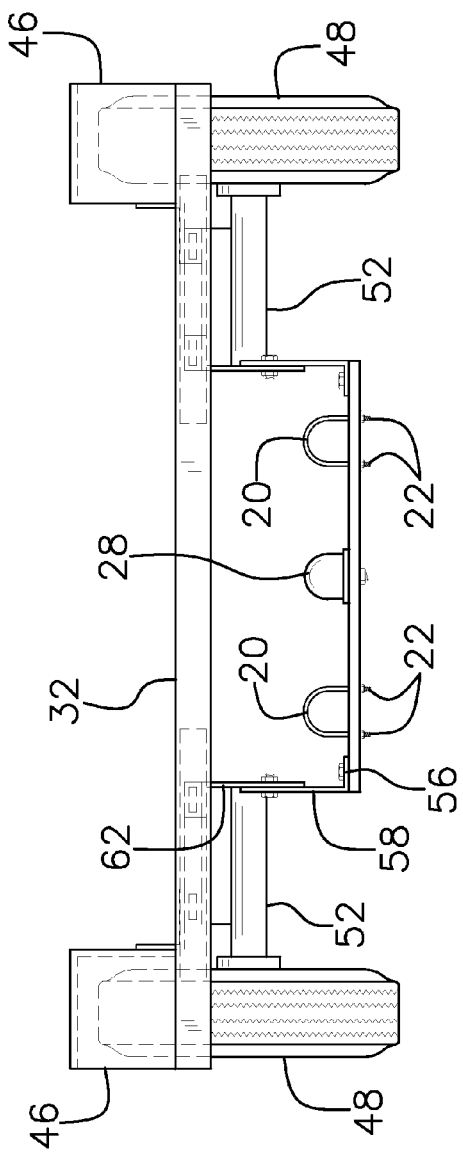
FIG. 4 is a front elevational view of the present invention.

A series of braces 44 are mounted on an upper surface of the outer rails 36 and are connected to fenders 46. The fenders 46 provide protection for a pair of wheels 48 of the trailer 10, and wheel assemblies 50. As illustrated in FIG. 3, half axles 52 are connected to the frame 34. It should be recognized that in addition to half axles 52, the trailer 10 can possess torsion, spindle type and full axles.

Figure 2:
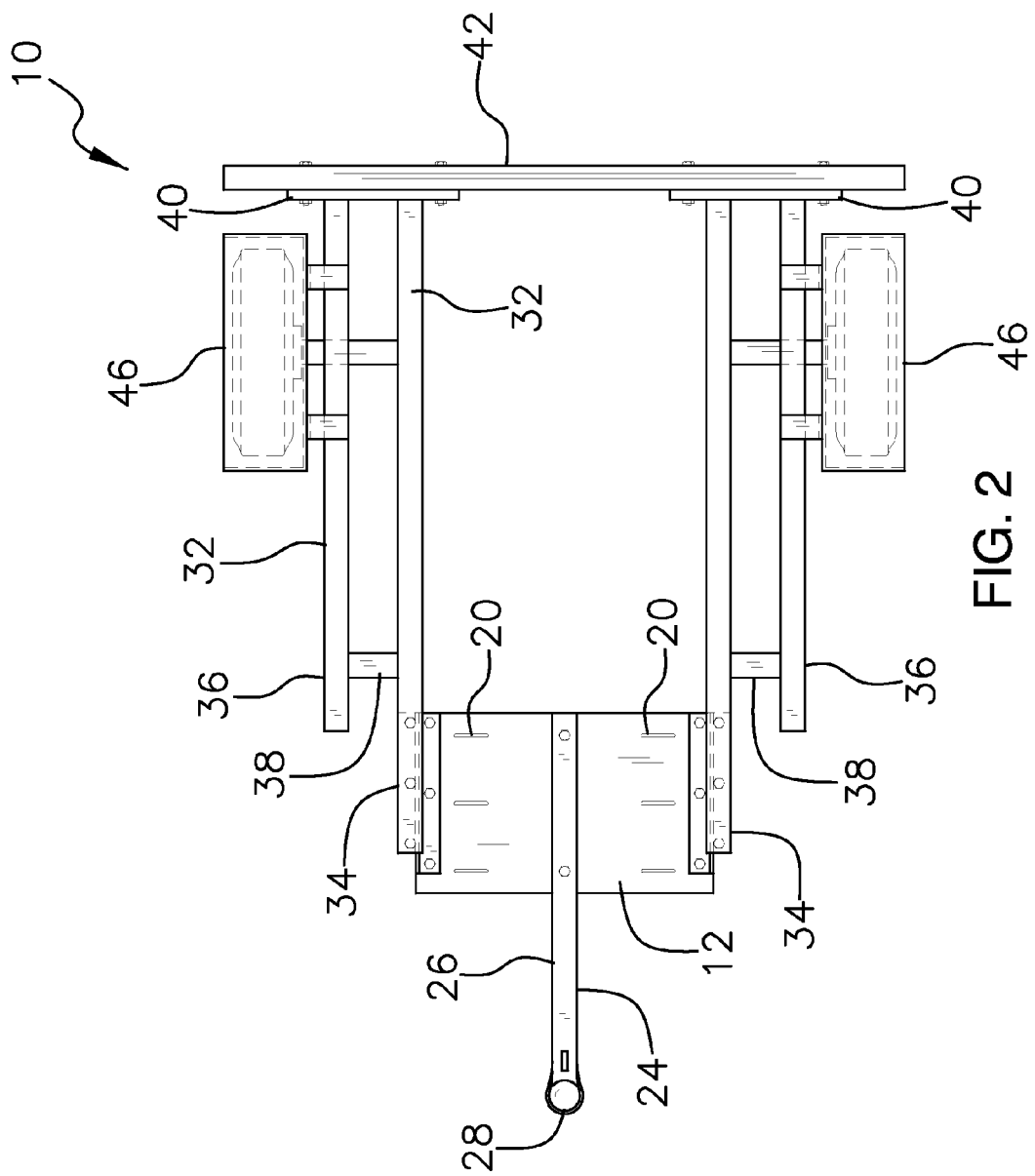
FIG. 2 is a top plan view of the present invention.

As illustrated in FIGS. 1-3, a generally L-shaped first adjustment plate 54 is demountably secured by bolts on the upper surface of the platform 12 juxtaposed the side peripheral edges 18 of the platform 12. The plate 54 is has a base 56 which is bolted to the upper planer surface of the platform 12 integrally formed with at one end of a panel 58. The panel 58 is oriented perpendicular to the base 56 and, upon securing the base 56 to the platform 12, upwardly depends from the platform 12. There are a series of apertures formed in the side walls 58 dimensioned to accept bolts.

A second adjustment plate 60, complementary to the first adjustment plate 54, has a panel 62 integrally formed with a base 64. The panel 62 is demountably affixed by bolts to an inner surface of the first adjustment plate 54. The base 64, which is angled perpendicular to the panel 62, has a series of apertures dimensioned to accept bolts. A bottom surface of a front end of the inner rails 34 is demountably secured by bolts to the base 64 of the plate 60.

Figure 5:
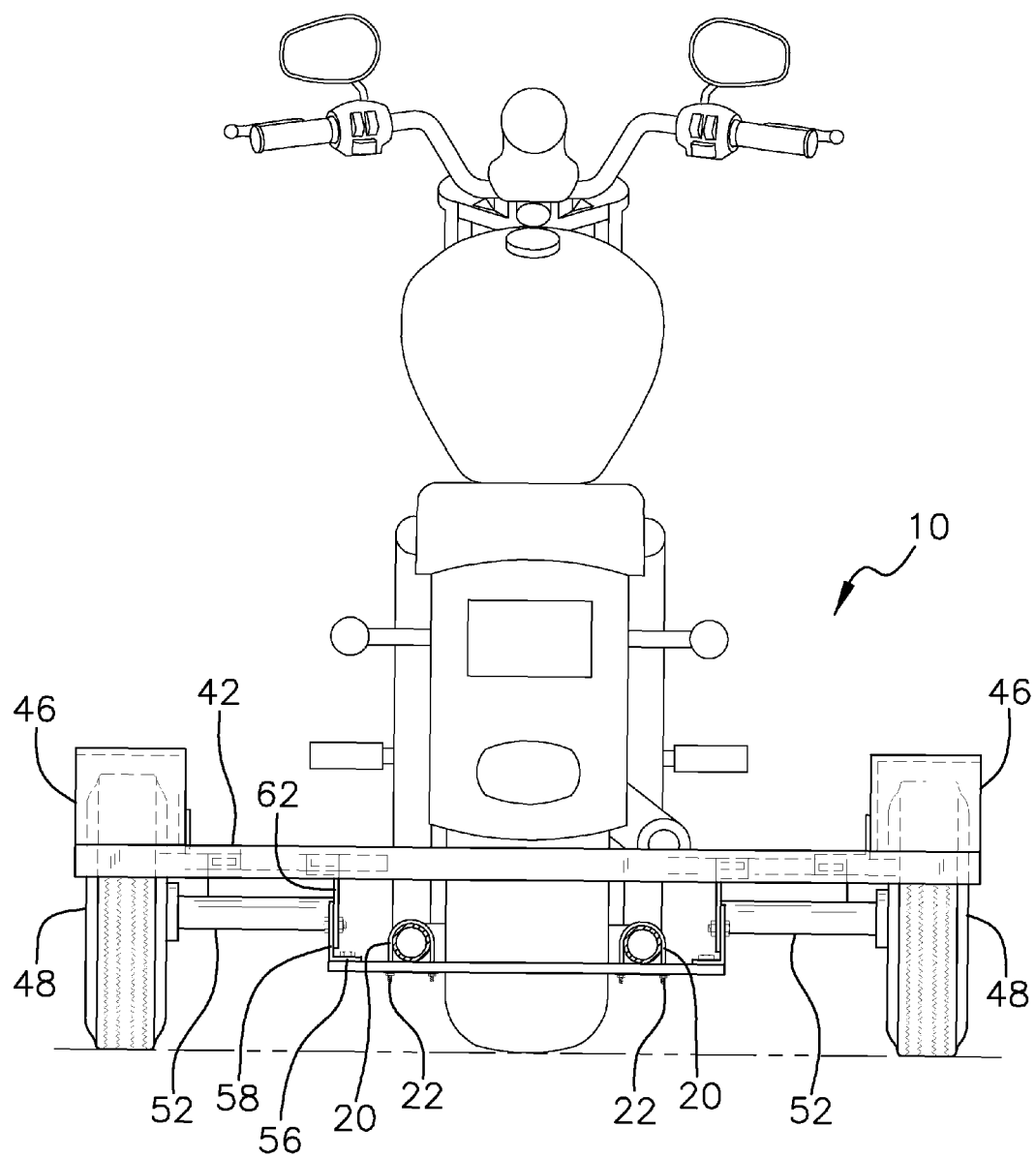
FIG. 5 is a rear elevational view of the present invention attached to a motorcycle.
Figure 7:
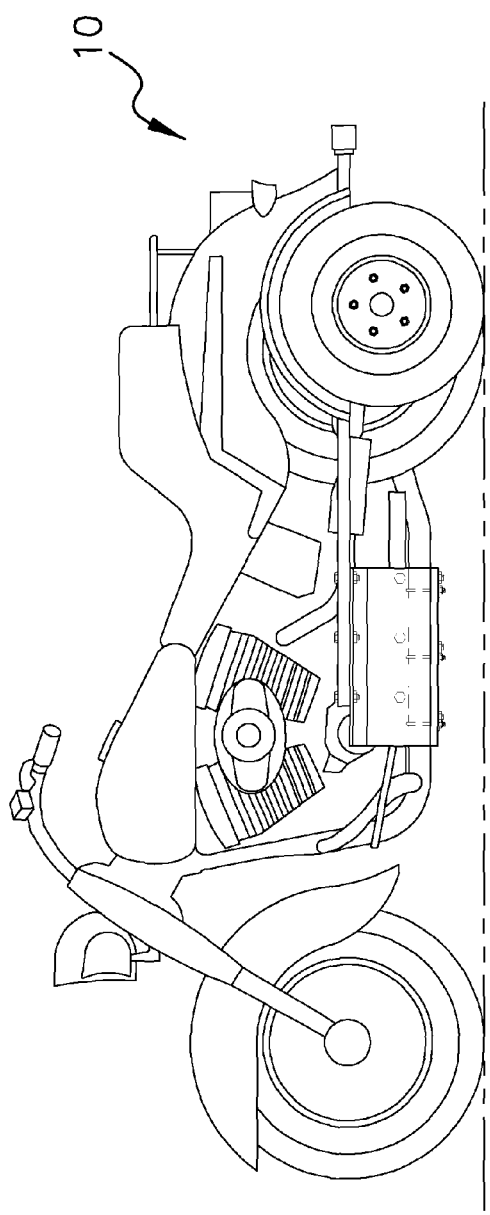
FIG. 7 is a side elevational view of the present invention with a belly plate mounted to the motorcycle.

As illustrated in FIGS. 5 and 7, the trailer 10 can be modified to fit around a motorcycle to create a four wheel vehicle. The tongue hitch 24 is removed and the platform 12 is secured by u-bolts 20 or welded to the frame of the motorcycle. The frame 32 is either bolted or welded to the platform 12. It should be recognized that since the frame is formed of rectangular tubing a planer surface is provided to mount flat stock of deck material, such as wood, metal or composite substrates to be set up for various types of cargo. The adjustment plates 54, 60 are installed and can be rotatably aligned around the motorcycle to make the deck mounted on the frame 32 as long or as wide as to fit cargo.

The cross brace 42 is demountable and can be used as a binding two point hitch which is bolted to the motorcycle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description only and should not be regarded as limiting the scope and intent of the invention.

I claim:

1. A convertible trailer for a motorcycle, comprising in combination:
    a platform mountable to a motorcycle frame;
    a tongue hitch comprised of a generally rectangular shaped tubular rail at a first end and a hitch connector integrally formed at a second end, demountably secured to the platform;
    a frame affixed to the platform having a pair of inner longitudinally placed rails and a pair of outer longitudinally placed rails, and further having lateral rail supports affixed between the inner rails and the outer rails;
    a cross brace demountably secured to the frame;
    opposed half axles attached to the frame; and
    a pair of wheels, one wheel being attached to each of the half axles.

2. The trailer as set forth in claim 1, further comprising a first adjustment plate secured to an upper surface of the platform, and a second adjustment plate affixed to the first adjustment plate, whereby the inner longitudinally placed rails of the frame are secured to the second adjustment plate.

3. The trailer as set forth in claim 2, further comprising a fender connected to the frame adjacent each of the wheels.

4. The trailer as set forth in claim 2, whereby the frame is formed of rectangular tubing.

5. The trailer as set forth in claim 2, further comprising a series of u-bolts which are used to secure the platform to the motorcycle frame.

6. A convertible trailer for a motorcycle, comprising in combination:
    a platform having a series of u-bolts mountable to a motorcycle frame;
    a tongue hitch comprised of a generally rectangular shaped tubular rail at a first end and a hitch connector integrally formed at a second end, demountably secured to the platform;
    a frame affixed to the platform having a pair of inner longitudinally placed rails and a pair of outer longitudinally placed rails, and further having lateral rail supports affixed between the inner rails and the outer rails;
    a cross brace demountably secured to the frame;
    a first adjustment plate secured to an upper surface of the platform, and a second adjustment plate affixed to the first adjustment plate, and whereby the inner longitudinally placed rails of the frame are secured to the second adjustment plate;
    opposed half axles attached to the frame; and
    a pair of wheels, one wheel being attached to each of the half axles.

* * * * *